April 28, 1936.  E. H. SMITH  2,038,964
BUMPER
Filed April 27, 1934  2 Sheets-Sheet 2

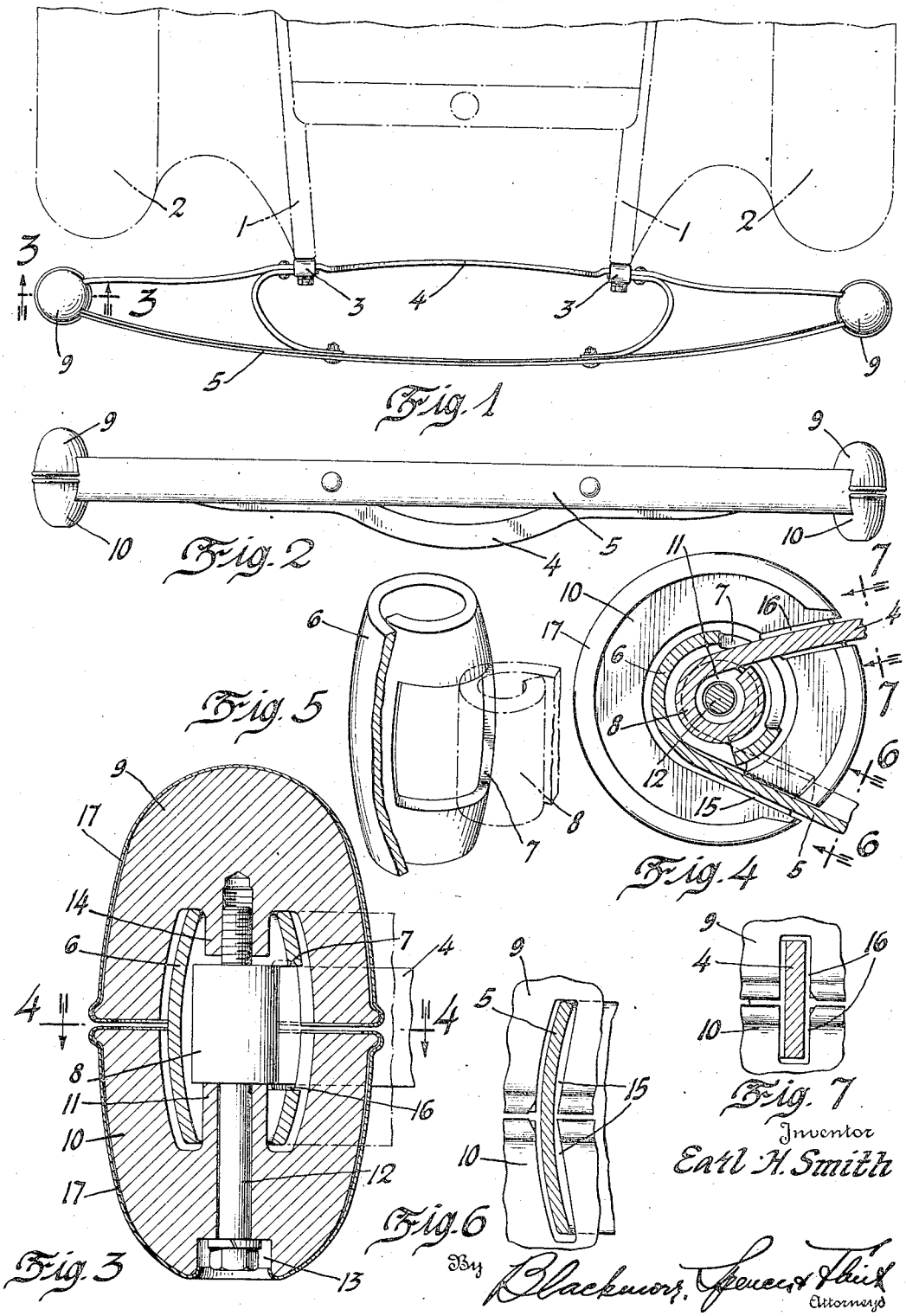

Inventor
Earl H. Smith
By Blackmore, Spencer & Flint
Attorneys

Patented Apr. 28, 1936

2,038,964

UNITED STATES PATENT OFFICE 2,038,964

BUMPER

Earl H. Smith, Birmingham, Mich., assignor to General Motors Corporation, Detroit, Mich., a corporation of Delaware Application April 27, 1934, Serial No. 722,636

9 Claims. (Cl. 293—55)

This invention relates to bumpers for motor vehicles, and more particularly to a novel design of bumper end weights which may be applied conveniently and readily to effect, in a simple and economical manner, a change in the natural vibration period of the vehicle.

Violent sidewise quiver of the vehicle front end comes in on some cars at speeds between 65 and 75 miles per hour, and it has been found that this annoying vibration can be eliminated by altering the inertia of the front end of the car so that the vibration period is outside the driving range. A convenient and effective remedy is the addition, to both ends of the front bumper, of weights of selected value, and by way of example, mention is made that weights of eight pounds on the 1933 Pontiac automobile and weights of six pounds on the 1933 Chevrolet automobile are found to be satisfactory. Such weights may be applied when required as accessory equipment to standard collision bumpers which extend transversely across the front of the vehicle by being mounted rigidly on the bumper structure and preferably as far as practical away from the longitudinal center line of the vehicle. In the case of bumpers comprising front and rear bars pivoted together at their ends, it is proposed to incorporate the weights near the pivotal joints and for the sake of simplicity and good appearance to build each weight as a medially divisible hollow barrel to fit over and house the end portions of the bumper bars.

Figure 8:
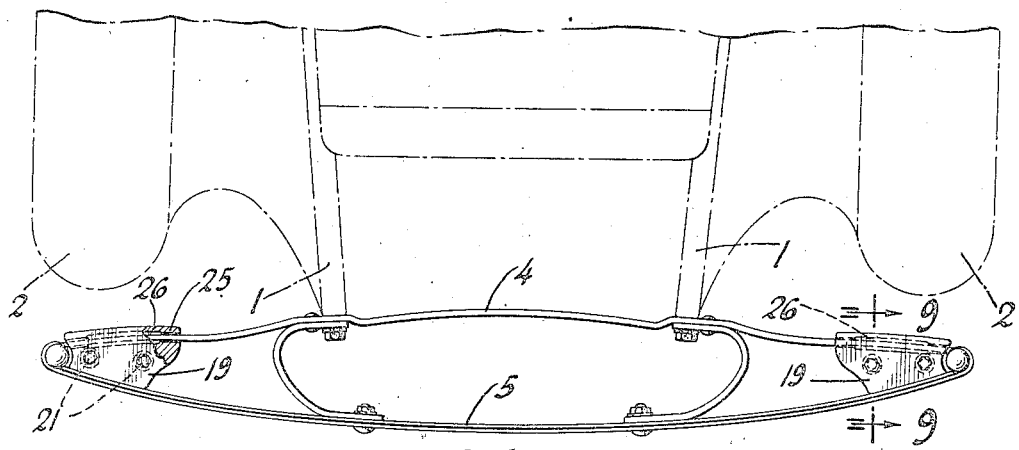
Figure 9:
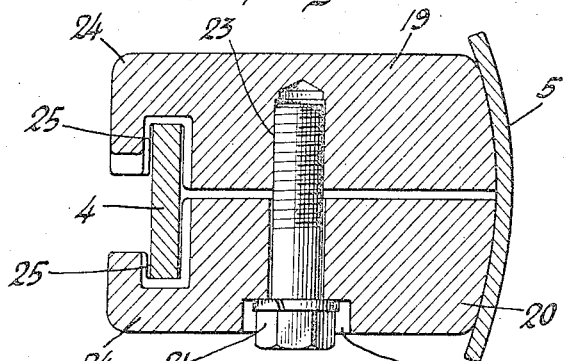
Figure 10:
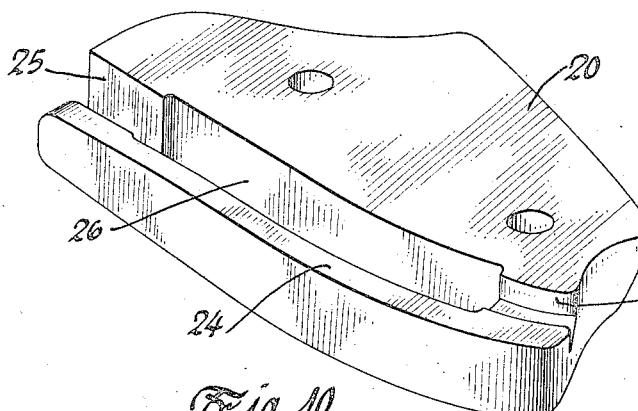

Preferred embodiments of the invention are illustrated in the accompanying drawings, wherein Figures 1 and 2 are respectively a top plan view and a front elevation of an automobile bumper having the weights applied thereto; Figure 3 is a vertical section of the end structure taken on line 3—3 of Figure 1; Figure 4 is a transverse section on line 4—4 of Figure 3; Figure 5 is a detail perspective view of the internested bumper bar terminals; Figures 6 and 7 are detailed views taken respectively on lines 6—6 and 7—7 of Figure 4; Figure 8 is a plan view of the bumper assembly with an optional type of weight; Figure 9 is a section taken on line 9—9 of Figure 8, and Figure 10 is a detail perspective view of the weight elements.

Referring to the drawings, the reference numeral 1 indicates longitudinal chassis members of the motor vehicle, carrying mud guards or fenders 2, extending outwardly therefrom on both sides of the vehicle and above the front steerable wheels. Each chassis frame member 1 carries at its front end a bracket 3 for mounting an intermediate portion of a supporting or back bar 4 of a bumper which extends transversely across the front of the vehicle between points forward of the wheels. The impact bar 5 is somewhat wider than the back bar 4 and is provided at each end with an eye 6, formed by curling up the extremity of the bar, and one wall of the eye has an opening 7 to receive a similar eye 8 on the back bar, which is adapted to be nested within and pivotally connected to the larger eye 6. Both bars are formed from flat flexible spring steel strip stock so as to be freely flexible in a horizontal plane, but substantially stiff and rigid in a vertical plane.

Enclosing the nested eyes 6 and 8 are the complemental dome or cupped weight members 9 and 10 of cast iron, lead or other heavy material. The lower weight member 10 is provided interiorly thereof with an upwardly projecting locating lug 11 to extend through the bottom of the large eye and into engagement with the bottom of the smaller eye and has a central bore or opening to receive a pivot pin 12, whose head is seated within a larger bore 13 in the bottom of the weight, with the pin extending upwardly through the eye 8 and into screw threaded engagement with the locating lug 14 on the top or upper dome member 9. The fastening pin 12 not only mounts the weight members rigidly on the bumper structure, but also provides a pivot connection for the nested eyes.

Formed in the wall of the cupped weights are alined openings 15 to receive the bar 5 and similar openings 16 for the passage of the back bar 4. To afford a finished appearance to the weight members, it is proposed to sheathe the same in sheet metal covers 17, which may be painted or plated for contrast with the finish on the bumper bars.

Less conspicuous are the weights when constructed and arranged according to the alternative embodiment of the invention illustrated in Figure 8. Here each end weight comprises upper and lower sections 19 and 20 secured together by a pair of upwardly extending bolts or studs 21 and mounted on the back bar 4 of the bumper in the space between the back bar and the impact member 5 immediately adjacent the end pivot joint. The combined height of the sections 19 and 20 is less than that of the front bar 5 so that the weights are concealed when the assembly is viewed from the front. This is shown best in Figure 9, which also shows one of the attachment bolts 21 having its head seated within a recess 22 on the underside of the lower block section 20 and its shank extending through the block and into engagement with the threaded hole 23 of the upper block 19. Both sections are provided at the rear with angled wings 24 cooperating to provide a slot for receiving the back bumper bar.

As seen in the perspective view, Figure 10, the ends of the groove as at 25 are formed to fit closely and clamp the bumper bar when the bolts are drawn tight, while the intermediate portion 26 is relieved to provide clearance around the bar.

From the above description it will be apparent that by means of the expedient here disclosed the moment of inertia of the front end of a vehicle may be easily and quickly modified and without considerable expense.

I claim:

1. In combination with a bumper having a pair of bars provided with nested pivotal eyes, of complemental vibration preventing weights positioned above and below the nested eyes and provided with skirt portions cooperating with each other and enclosing said eyes, and alined passages in said skirted portions for the projection therethrough of portions of the bars adjacent said eyes, means rigidly connecting said weights to the bars.

2. In a motor vehicle, a pair of bumper bars having internested eyes at opposite ends, a pair of complementary dome shaped vibration preventing weight members at each of said ends arranged in opposed relation to receive said eyes and provided with locating lugs projecting interiorly of the eyes and common fastening means holding the eyes together and the weight members rigidly thereto, said weight members being of sufficient mass to substantially prevent frame vibration.

3. In a bumper having a pair of bars, means hingedly connecting the ends of the bars including eye formations on the respective bars nested one within the other, a pair of complementary domed vibration preventing weights fitted in opposed relation to receive and enclose said eyes and a pivot bolt extending through the nested eye formations and rigidly anchoring the weights thereto.

4. In a motor vehicle having a pair of bumper bars provided at opposite ends with internested and pivoted eye formations, means to change the natural vibration period of the vehicle including a pair of complementary hollow weights receiving and enclosing said eye formations and means rigidly mounting said hollow weights, on said bars.

5. In combination with a bumper having a pair of bars pivotally connected at their ends, of a pair of cupped vibration preventing weight members fitted together to enclose and rigidly engage the pivotally connected bar ends and a relatively thin ornamental shell carried by each weight member.

6. A motor vehicle having a bumper comprising front and rear bars, means to change the moment of inertia of the front of the vehicle, including a pair of weights for attachment to opposite ends of the bumper structure, each weight comprising horizontally split sections located in the space between the bars, oppositely disposed grooved seats in the sections to receive therebetween the rear bar, and means securing the sections together and rigidly mounting the same through said seats on the rear bar.

7. A bumper end weight comprising a pair of complementary members of such weight as will substantially prevent frame vibration, bumper receiving recesses in said members adapted to enclose therein a portion of a bumper, and connecting means between said members for holding them rigid in relation to a bumper.

8. To correct front end wobble of a motor vehicle having a bumper as a part of its equipment, means adapted for use as an accessory device and for application to the vehicle bumper whereby to change the moment of inertia of the vehicle, said means comprising a pair of complementary weights sufficient to substantially prevent frame vibration and having recesses in their mating faces to receive and enclose a portion of the bumper, and means for joining said weights together as a rigid unit with the vehicle bumper.

9. In combination a vehicle having a bumper, bumper attachable accessory means for adding weight to change the vibration period of the vehicle, said means comprising a pair of members of such weight as will substantially prevent frame vibration, and mounting means connecting the members rigidly near opposite ends of the bumper.

EARL H. SMITH.